(12) United States Patent
Zheng

(10) Patent No.: US 10,455,542 B2
(45) Date of Patent: Oct. 22, 2019

(54) METHOD OF SYNCHRONIZING NOTIFICATION MESSAGES FOR ELECTRONIC DEVICES AND ELECTRONIC DEVICES

(71) Applicant: HuiZhou TCL Mobile Communication Co., Ltd., HuiZhou (CN)

(72) Inventor: Yu Zheng, HuiZhou (CN)

(73) Assignee: HuiZhou TCL Mobile Communication Co., Ltd., HuiZhou, Guangdong (CN)

( * ) Notice: Subject to any disclaimer, the term of this patent is extended or adjusted under 35 U.S.C. 154(b) by 199 days.

(21) Appl. No.: 14/894,280

(22) PCT Filed: Mar. 10, 2015

(86) PCT No.: PCT/CN2015/073919
§ 371 (c)(1),
(2) Date: Nov. 25, 2015

(87) PCT Pub. No.: WO2015/169123
PCT Pub. Date: Nov. 12, 2015

(65) Prior Publication Data
US 2016/0249321 A1     Aug. 25, 2016

(30) Foreign Application Priority Data
May 7, 2014    (CN) .......................... 2014 1 0190821

(51) Int. Cl.
*G06F 15/16*     (2006.01)
*H04W 68/02*     (2009.01)
(Continued)

(52) U.S. Cl.
CPC ....... *H04W 68/02* (2013.01); *H04M 3/42263* (2013.01); *H04M 3/42382* (2013.01);
(Continued)

(58) Field of Classification Search
None
See application file for complete search history.

(56) References Cited

U.S. PATENT DOCUMENTS 8,738,723 B1 *  5/2014  Faaborg ................. H04L 51/04
                                                        709/207
9,325,644 B2    4/2016  Douglas et al.
(Continued)

FOREIGN PATENT DOCUMENTS

CN          103442344 A       12/2013
CN          103957150 A        7/2014
(Continued)

OTHER PUBLICATIONS

Amendment to Non-Final Office action dated Nov. 9, 2017, for U.S. Appl. No. 14/893,845, filed Nov. 24, 2015, Title: Method, Server and Electronic Devices of Synchronizing Notification Messages for Electronic Devices.

*Primary Examiner* — Umar Cheema
*Assistant Examiner* — Anthony T Rotolo

(57) ABSTRACT

A method of synchronizing notification messages for electronic devices and electronic devices which may include monitoring if an electronic device has a notification message, and if it has a notification message, determining if the electronic device is on standby, if the electronic device is determined to be on standby, then if the active electronic device associated with the electronic device and having a valid communication address is determined to be present, sending the notification message to the active electronic device. At least one embodiment facilitates the gathering of notification messages where a user can promptly receive notification messages.

15 Claims, 2 Drawing Sheets

(51) Int. Cl.
  *H04W 4/21* (2018.01)
  *H04W 52/02* (2009.01)
  *H04M 3/42* (2006.01)
  *H04W 4/08* (2009.01)
  *H04W 4/12* (2009.01)
  *H04M 3/54* (2006.01)

(52) U.S. Cl.
  CPC ........... *H04W 4/21* (2018.02); *H04W 52/028* (2013.01); *H04M 3/54* (2013.01); *H04M 2203/2094* (2013.01); *H04W 4/08* (2013.01); *H04W 4/12* (2013.01); *Y02D 70/1242* (2018.01); *Y02D 70/26* (2018.01)

(56) References Cited

U.S. PATENT DOCUMENTS

| | | | |
|---|---|---|---|
| 2005/0031094 A1* | 2/2005 | Gilbert | G11B 20/10009 379/88.14 |
| 2006/0173966 A1* | 8/2006 | Jennings, III | H04L 51/04 709/207 |
| 2007/0058658 A1* | 3/2007 | Ruckart | H04W 4/16 370/444 |
| 2010/0029250 A1* | 2/2010 | Gupta | H04M 3/537 455/413 |
| 2011/0173323 A1* | 7/2011 | Fimbel | G08B 21/0423 709/224 |
| 2011/0258682 A1 | 10/2011 | Yin | |
| 2012/0072844 A1* | 3/2012 | Lefrancois des Courtis | G06Q 30/02 715/736 |
| 2013/0143529 A1* | 6/2013 | Leppanen | H04W 4/08 455/411 |
| 2014/0005809 A1* | 1/2014 | Frei | H04L 29/1249 700/90 |
| 2014/0136633 A1* | 5/2014 | Murillo, Jr. | H04L 51/24 709/206 |
| 2015/0120655 A1* | 4/2015 | Chi | H04L 67/1095 707/613 |

FOREIGN PATENT DOCUMENTS

| | | |
|---|---|---|
| CN | 103973786 A | 8/2014 |
| EP | 2725768 A1 | 4/2014 |

* cited by examiner

METHOD OF SYNCHRONIZING NOTIFICATION MESSAGES FOR ELECTRONIC DEVICES AND ELECTRONIC DEVICES

TECHNICAL FIELD

The present disclosure relates to the field of communication technologies, and specifically to a method of synchronizing notification messages for electronic devices.

BACKGROUND

As multimedia electronic devices (e.g. cell phones, PDAs, personal computers) have become more popular over recent years, the number of multimedia electronic devices owned by one person contemporaneously becomes increasingly high. As sizes of multimedia electronic devices become increasingly large, it can be difficult for one person to carry a large number of multimedia electronic devices. On the other hand, when each multimedia electronic device has more and more functions, some multimedia electronic devices are not suitable to be used as auxiliary devices to other multimedia electronic devices, except for a limited number of wearable multimedia electronic devices.

Thus, messages that one person may receive may show up on a plurality of multimedia electronic devices, while the person cannot conveniently gather and promptly know the messages. For example, when a user holds a tablet to browse webpages or make online purchases, IM (instant messages) and text messages on a cell phone cannot be viewed immediately and directly. The user must turn to the cell phone to view them. In some environments, moreover, a user may even be unable to immediately locate where his/her cell phone is. For example, the cell phone is in another room.

SUMMARY

At least one embodiment provides a method of synchronizing notification messages for electronic devices and electronic devices where a user can promptly receive notification messages.

At least one embodiment of the method of synchronizing notification messages for electronic devices includes monitoring if an electronic device has a notification message and if the electronic device has a notification message, determining if the electronic device is on standby. If the electronic device is determined to be on standby, determining if an active electronic device associated with the electronic device and having a valid communication address is present and if the active electronic device is determined to be present, the electronic device can send the notification message to the active electronic device. If the electronic device is active, the electronic device can display the notification message. An embodiment can further include a step of timing a first preset wait period and determining if the active electronic device has displayed the notification message, and if it determines that the active electronic device has displayed the notification message, then determining if the first preset wait period has passed. If it is determined that the first preset wait period has not passed, the electronic device can receive a message that the active electronic device has displayed the notification message.

An embodiment of the method can further include the step that if it is determined that the first preset wait period has passed, the electronic device confirms that the active electronic device has not executed the operation to display the notification message.

At least one further embodiment of the method can include timing the second preset wait period and determining if the user has viewed the notification message displayed by the active electronic device. If it is determined that the user has viewed the notification message displayed by the active electronic device, then determining if the second preset wait period has passed. If it is determined that the second preset wait period has not passed, the electronic device can receive a message that the user has viewed the notification message. At least one further embodiment of the method can include a step that if the second preset wait period has passed, the electronic device can confirm that the user has not viewed the notification message.

Furthermore, the step of "determining if an active electronic device associated with the electronic device and having a valid communication address is present; if it determines that the active electronic device is present, the electronic device sends the notification message to the active electronic device," can further include where the electronic device sends a request message to the management server, wherein the request message is used to request a communication address list of active electronic devices, and the request message can carry a message identifier The management server can respond to the request message and send the communication address list of active electronic devices to the electronic device according to the message identifier, determining if at least one valid communication address is present in the communication address list. If it is determined that at least one valid communication address is present, the electronic device can send the notification message to the active electronic device having a valid communication address.

At least one further embodiment of the method can include the step that if it is determined that no valid communication address is present in the communication address list, the electronic device can display the notification message.

At least one further embodiment provides an electronic that can include a monitoring module configured to monitor if the electronic device has a notification message, a determining module configured to, if the monitoring module monitors that the electronic device has the notification message, determine if the electronic device is on standby, a control module configured to, if the determining module determines that the electronic device is on standby, determine if an active electronic device associated with the electronic device and having a valid communication address is present, a sending module configured to send a message; wherein, if the control module determines that the active electronic device is present, the sending module can send the notification message to the active electronic device.

At least one further embodiment includes a display module configured to display a message, where, if the determining module determines that the electronic device is active, the display module can display the notification message.

At least one further embodiment includes a receiving module configured to receive a message, where the sending module can send a request message to the management server, where the request message is used to request a communication address list of active electronic devices, and the request message can carry a message identifier. The management server can respond to the request message and send the communication address list of active electronic devices to the receiving module according to the message identifier.

At least one further embodiment includes a control module that can be further configured to determine if at least one valid communication address is present in the communication address list, and if it is determined that at least one valid communication address is present, the sending module can send the notification message to the active electronic device having a valid communication address. The control module can further be configured to time the first preset wait period and determine if the active electronic device has displayed the notification message, and if it is determined that the active electronic device has displayed the notification message, determine if the first preset wait period has passed. If it is determined that the first preset wait period has not passed, the receiving module can receive a message that the active electronic device has displayed the notification message. The control module can further be configured to time the second preset wait period and determine if the user has viewed the notification message displayed by the active electronic device, and if it is determined that the user has viewed the notification message displayed by the active electronic device, determine if the second preset wait period has passed. If it is determined that the second preset wait period has not passed, the receiving module can receive a message that the user has viewed the notification message.

At least one further embodiment includes a control module that can determine that no valid communication address is present in the communication address list, the display module can display the notification message.

At least one further embodiment includes a control module that can determine that the first preset wait period has passed, the control module can determine that the active electronic device has not executed the operation to display the notification message.

At least one further embodiment includes a control module that can determine that the second preset wait period has passed, the control module can determine that the displayed notification message has not been viewed by the user.

At least one further embodiment provides an electronic device that can include a control module configured to determine if the electronic device is active, a display module configured to display a message, a receiving module configured to receive a message, where, if the control module determines that the electronic device is active, the receiving module can receive a notification message sent by a standby electronic device associated with the electronic device, and the display module can display the notification message.

At least one further embodiment includes a sending module configured to send a message, where, if the control module determines that the electronic device is active, the sending module can send the communication address of the electronic device to the management server. The management server can respond to the request message sent by a standby electronic device associated with the electronic device, and send the communication address of the electronic device to the standby electronic device according to the message identifier carried by the request message, where the request message is used to request a communication address of the active electronic device. The standby electronic device can determine if the communication address of the electronic device is valid, and if the standby electronic device determines that the communication address of the electronic device is valid, the standby electronic device can send the notification message to the receiving module.

The method of synchronizing notification messages for electronic devices and electronic devices according to at least one exemplary embodiment facilitates the gathering of notification messages where a user can promptly receive notification messages.

DETAILED DESCRIPTION

Embodiments of the present invention will be described in detail below with reference to the accompanying drawings. However, the present invention may be implemented in numerous different forms, and the present invention shall not be construed to be limited by specific examples set forth herein. On the contrary, the provision of these examples is to explain the principles and actual applications of the present invention in a non-limiting fashion, where others skilled in the art can understand various examples and various modifications applicable for specific expected applications of the present invention.

In the accompanying drawings, the same legends are typically used to represent the same components. It should be understood that, although terms such as "first," "second," and "third," may be used to describe various components herein, those components shall not be limited by these terms. These terms are used only to differentiate one component from the other component.

Electronic devices according to the examples of the present invention may include any proper type of mobile and immobile devices. Non-limiting examples of immobile devices may include desktop computers, household appliances having message display or prompt functions, household electronic entertainment devices or other similar devices, while examples of mobile devices may include mobile terminals, such as video phones, mobile phones, smart phones, International Mobile Communication System 2000 (IMT-2000) terminals, WCDMA terminals, UMTS terminals, PDAs, PMPs, DMB terminals, E-books, laptops, tablets, wearable devices, digital cameras, digital photo frames.

Figure 1:
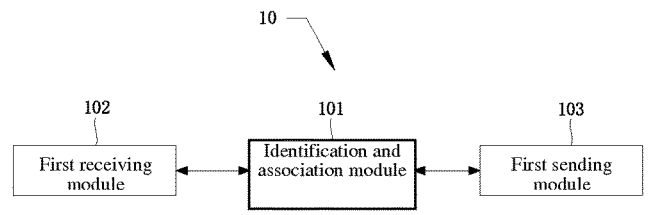
FIG. 1 depicts a block diagram of the management server in an example according to at least one embodiment.

FIG. 1 depicts a block diagram of the management server according to at least one embodiment. As illustrated in FIG. 1, the management server 10 according to at least one embodiment may comprise an identification and association module 101, a first receiving module 102, and a first sending module 103. The identification and association module 101 can be configured to provide services of ID management and message management for electronic devices. A non-limiting example can include the identification and association module 101 being configured to manage registered electronic devices, dynamic ID and status of electronic devices.

Figure 2:
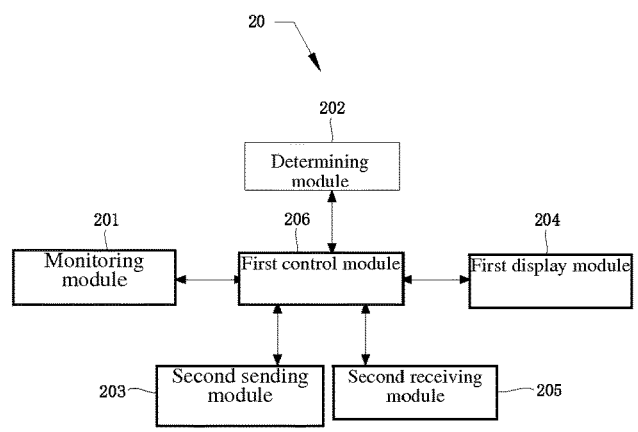
FIG. 2 depicts a block diagram of the electronic device in an example according to at least one embodiment.
Figure 3:
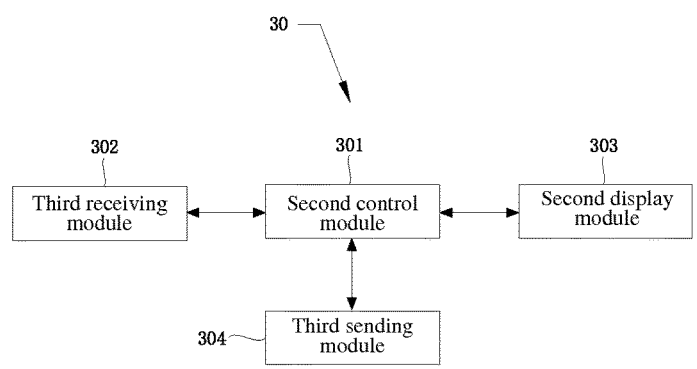
FIG. 3 depicts a block diagram of the electronic device in another example according to at least one embodiment.

The identification and association module 101 can receive registration from at least two electronic devices (e.g., the electronic device 20 in FIG. 2 and the electronic device 30 in FIG. 3). According to a unique identifier provided by each electronic device during registration, the identification and association module 101 can associate the electronic devices that use the same unique identifier and can form an electronic device set. For example, the identification and association module 101 can associate electronic devices that use the unique identifier. Moreover, the identification and association module 101 can manage and maintain a list of active electronic devices for this electronic device set. For example, according to the unique identifier provided by the electronic device 20 and the electronic device 30, the identification and association module 101 can associate the electronic device 20 and the electronic device 30 that use the same unique identifier and can form an electronic device set. For example, the identification and association module 101 can associate the electronic device 20 and the electronic device 30 that use the same unique identifier.

In addition, the identification and association module 101 can assign a simplified unique identifier to each electronic device that requests registration, the simplified unique identifier then can be used as the ID identifier of an electronic device during communications. For example, the identification and association module 101 can assign a simplified unique identifier to electronic device 20 and electronic device 30 that request registration, where the simplified unique identifier can be an identifier of the same type as the unique identifier used by the electronic device during registration with the identification and association module 101, or can be an identifier of any other form and/or format that is assigned by the identification and association module 101 to an electronic device and can be identified and understood by the identification and association module 101, to which there are no specific limitations in embodiments of the present invention.

In at least one further embodiment the identification and association module 101 can further manage an electronic device's active status (for example, if the electronic device is in a status of being operated by a user, or the screen of the electronic device is turned on) and standby status (for example the electronic device is in a status of not being operated by a user, or, the screen of the electronic device is turned off). For example, when the identification and association module 101 receives an active notification message sent from the electronic device 30, the identification and association module 101 can add the communication address of the electronic device 30 into the communication address list of active electronic devices managed thereby according to the message identifier (e.g. the message identifier may be the unique identifier used by the electronic device 30 during registration with the identification and association module 101, or may be the simplified unique identifier assigned by the identification and association module 101 to the electronic device 30) carried in the active notification message. When the identification and association module 101 receives a standby notification message, sent from the electronic device 30, the identification and association module 101 can delete the communication address of the electronic device 30 from the communication address list of active electronic devices managed according to the message identifier (e.g. the message identifier may be the unique identifier used by the electronic device 30 during registration with the identification and association module 101, or may be the simplified unique identifier assigned by the identification and association module 101 to the electronic device 30) carried in the standby notification message.

The first receiving module 102 may be configured to receive a message. For example, when the electronic device 20 determines that it is in a standby status itself, the first receiving module 102 may be used to receive a request message submitted by the standby electronic device 20, where the request message can be used to request the communication address list of active electronic devices managed by the identification and association module 101, and the request message can carry the message identifier (for example, the message identifier may be the unique identifier used by the electronic device 20 during registration with the identification and association module 101, or may be the simplified unique identifier assigned by the identification and association module 101 to the electronic device 20).

The first sending module 103 may be used to send a message. For example, when the first receiving module 102 receives the request message submitted by the standby electronic device 20, the first sending module 103 can respond to the request message submitted by the standby electronic device 20, and send the communication address list of active electronic devices managed by the identification and association module 101 to the standby electronic device 20 according to the message identifier carried by the request message.

The electronic device 20 and the electronic device 30 according to at least one embodiment will be described in detail below with reference to FIG. 2 and FIG. 3, respectively. FIG. 2 depicts a block diagram of the electronic device 20 according to at least one embodiment. Referring to FIG. 2, the electronic device 20 can include a monitoring module 201, a determining module 202, a second sending module 203, a first display module 204, a second receiving module 205 and a first control module 206.

The first control module 206 may use the unique identifier (e.g. a device identifier) of the electronic device 20 to register with the identification and association module 101 (as illustrated in FIG. 1) so as to obtain the simplified unique identifier assigned by the identification and association module 101. Moreover, the identification and association module 101 can associate the electronic device 20 and other electronic devices (e.g. the electronic device 30 may use the unique identifier shown in FIG. 3) that use the same unique identifier and can form an electronic device set. For example, the identification and association module 101 can associate the electronic device 20 and other electronic devices that use the same unique identifier.

In at least one further embodiment the identification and association module 101 assigns a simplified unique identifier to the electronic device 20 that requests registration, the simplified unique identifier can be used as the ID identifier of the electronic device 20 during communications, where the simplified unique identifier may be an identifier of the same type as the unique identifier used by the electronic device 20 during registration with the identification and association module 101, or may be an identifier of any other form and/or format that is assigned by the identification and association module 101 to the electronic device 20 and can be identified and understood by the identification and association module 101, to which there are no specific limitation in embodiments of the present invention.

In at least one further embodiment when the first display module 204 is in an active status (e.g., the first display module 204 may be a touchscreen, and its active status may be a status that the touchscreen is turned on or being touched, or a status that other components with human-machine interaction functions on the electronic device 20 are working, or a status that other screens connected with the electronic device 20 in a physical or wireless way are turned on or being used), the second sending module 203 can send the active notification message to the identification and association module 101. The identification and association module 101 can add the communication address of the electronic device 20 into the communication address list of active electronic devices managed thereby according to the message identifier (e.g. the message identifier may be the unique identifier used by the electronic device 20 during registration with the identification and association module 101, or may be the simplified unique identifier assigned by the identification and association module 101 to the electronic device 20) carried in the active notification message. When the first display module 204 is in a standby status (e.g., a status such as the screen is turned off), the second sending module 203 can send the standby notification message to the identification and association module 101, and the identification and association module 101 can delete the communication address of the electronic device 20 from the communication address list of active electronic devices managed thereby according to the message identifier (e.g. the message identifier may be the unique identifier used by the electronic device 20 during registration with the first control module 101, or may be the simplified unique identifier assigned by the identification and association module 101 to the electronic device 20) carried in the standby notification message.

The monitoring module 201 can be configured to monitor if the electronic device 20 has a notification message. Non-limiting examples of the notification message may be a call reminder, an IM (instant message), a text message, a message prompt from an auxiliary device, a call prompt from other devices, a message of electronic device status alarm or a message of electronic device application prompt. If the monitoring module 201 monitors that the electronic device 20 has the notification message, the determining module 202 can determine if the first display module 204 is in a standby status. The first display module 204 can also be configured to display a message. For example, if the determining module 202 determines that the first display module 204 is in an active status, the first display module 204 can display the notification message. The determining module 202 can determine if the first display module 204 is in a standby status, and the first control module 206 can determine if an active electronic device associated with the electronic device 20 and having a valid communication address is present.

The second sending module 203 can be configured to display a message. If the first control module 206 determines that an active electronic device associated with the electronic device 20 and having a valid communication address is present, the second sending module 203 can send the notification message to the active electronic device associated with the electronic device 20 and having a valid communication address.

At least one embodiment of the first control module 206 and the second sending module 203 above will be described in detail below, respectively.

The second sending module 203 can send a request message to the first receiving module 102 (as illustrated in FIG. 1), where the request message is used to request a communication address list of associated active electronic devices, and the request message can carry a message identifier (for example, the message identifier may be the unique identifier used by the electronic device 20 during registration with the identification and association module 101, or may be the simplified unique identifier assigned by the identification and association module 101 to the electronic device 20). The first sending module 103 (as illustrated in FIG. 1) can respond to the request message, and send the communication address list of active electronic devices to the second receiving module 205 according to the message identifier.

In at least one embodiment, the first control module 206 can determine if at least one valid communication address is present in the communication address list and if the first control module 206 determines that at least one valid communication address is present in the communication address list, the second sending module 203 can send the notification message to the active electronic device having a valid communication address. For example, the second sending module 203 sends the notification message to an active electronic device having a valid communication address and associated with the electronic device.

In at least one further embodiment if the first control module 206 determines that no valid communication address is present in the communication address list, the first display module 204 can display the notification message.

The first control module 206 can keep time of a first preset wait period and can determine if the active electronic device has displayed the notification message. If the first control module 206 determines that the active electronic device has displayed the notification message, then the first control module 206 can determine if the first preset wait period has passed. If the first control module 206 determines that the first preset wait period has not passed, the second receiving module 205 can receive a message that the active electronic device has displayed the notification message. For example, if the first control module 206 determines that the first preset wait period has not passed, the first control module 206 can determine that the active electronic device has executed the operation to display the notification message.

In at least one further embodiment if the first control module 206 determines that the first preset wait period has passed, the second receiving module 205 can receive a message that the active electronic device has not displayed the notification message. For example, if the first control module 206 determines that the first preset wait period has passed, the first control module 206 can determine that the active electronic device has not executed the operation to display the notification message. Subsequently, the first display module 204 can display the notification message.

The first control module 206 can keep time of the second preset wait period and can determine if the user has viewed the notification message displayed by the active electronic device. If the first control module 206 determines that the user has viewed the notification message displayed by the active electronic device, the first control module 206 can determine if the second preset wait period has passed. If the first control module 206 determines that the second preset wait period has not passed, the second receiving module 205 can receive a message that the user has viewed the notification message.

In at least one further embodiment, if the first control module 206 determines that the second preset wait period has passed, the first control module 206 can determine that the user has not viewed the notification message displayed by the active electronic device. For example, if the first control module 206 determines that the second preset wait period has passed, the first control module 206 can determine that the user has not viewed the notification message displayed by the active electronic device regardless of whether the second receiving module 205 receives or does not receive a message that the displayed notification message has been viewed by the user. Moreover, when the user views the notification message displayed on the active electronic device at a future time (e.g. a time after the second preset wait period), the second receiving module 205 can receive a message that the user has viewed the notification message.

FIG. 3 depicts a block diagram of the electronic device 30 according to at least one exemplary embodiment. Referring to FIG. 3, the electronic device 30 can include a second control module 301, a third receiving module 302, a second display module 303 and a third sending module 304. The second control module 301 may use the unique identifier (e.g. a device identifier) of the electronic device 30 to register with the identification and association module 101 (as illustrated in FIG. 1) so as to obtain the simplified unique identifier assigned by the identification and association module 101. Moreover, the identification and association module 101 can associate the electronic device 30 and other electronic devices (e.g. the electronic device 20 may use the unique identifier shown in FIG. 2) that use the same unique identifier and can form an electronic device set. For example, the identification and association module 101 can associate the electronic device 30 and other electronic devices that use the same unique identifier.

In at least one further embodiment, the identification and association module 101 can assign a simplified unique identifier to the electronic device 30 that requests registration, the simplified unique identifier can be used as the ID identifier of the electronic device 30 during communications, where the simplified unique identifier may be an identifier of the same type as the unique identifier used by the electronic device 30 during registration with the identification and association module 101, or may be an identifier of any other form and/or format that is assigned by the identification and association module 101 to the electronic device 30 and can be identified and understood by the identification and association module 101, to which there are no specific limitation in embodiments of the present invention.

In at least one further embodiment when the second display module 303 is in an active status (e.g., the second display module 303 may be a touchscreen, and its active status may be a status that the touchscreen is turned on or being touched, or a status that other components with human-machine interaction functions on the electronic device 30 are working), the third sending module 304 can send the active notification message to the identification and association module 101, the identification and association module 101 can add the communication address of the electronic device 30 into the communication address list of active electronic devices managed thereby according to the message identifier (e.g. the message identifier may be the unique identifier used by the electronic device 30 during registration with the identification and association module 101, or may be the simplified unique identifier assigned by the identification and association module 101 to the electronic device 30) carried in the active notification message. When the second display module 303 is in a standby status (e.g., a status such as the screen is turned off), the third sending module 304 can send the standby notification message to the identification and association module 101, and the identification and association module 101 can delete the communication address of the electronic device 30 from the communication address list of active electronic devices managed thereby according to the message identifier (e.g. the message identifier may be the unique identifier used by the electronic device 30 during registration with the first control module 101, or may be the simplified unique identifier assigned by the identification and association module 101 to the electronic device 30) carried in the standby notification message.

The second control module 301 can be configured to determine if the second display module 303 is in an active status. The third receiving module 302 can be configured to receive a message. The second display module 303 can be configured to display a message, and the third sending module 304 can be configured to send a message.

In at least one embodiment, if the second control module 301 determines that the second display module 303 is in an active status, the third sending module 304 can send the communication address of the electronic device 30 to the identification and association module 101. The first sending module 103 can respond to the request message sent by a standby electronic device associated with the electronic device 30, and can send the communication address of the electronic device 30 to the standby electronic device according to the message identifier (e.g. the message identifier may be the unique identifier used by the standby electronic device during registration with the identification and association module 101, or may be the simplified unique identifier assigned by the identification and association module 101 to the standby electronic device) carried by the request message, where the request message can be used to request a communication address of the active electronic device. The standby electronic device can determine if the communication address of the electronic device 30 is valid and if the standby electronic device determines that the communication address of the electronic device 30 is valid, the standby electronic device can send the notification message to the third receiving module 302. For example, if the second control module 301 determines that the second display module 303 is in an active status, the third receiving module 302 can receive the notification message sent by the standby electronic device associated with the electronic device 30, and the second display module 303 may display the notification message.

Figure 4:
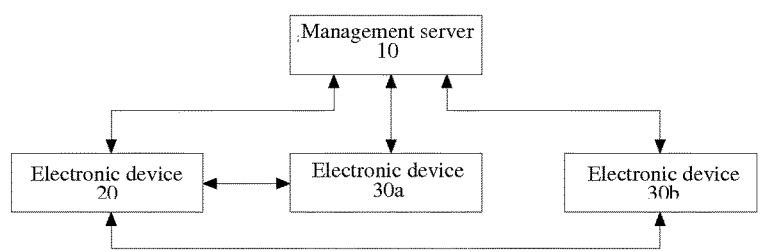
FIG. 4 illustrates communications between the management server and the electronic device in an example according to at least one embodiment.
Figure 5:
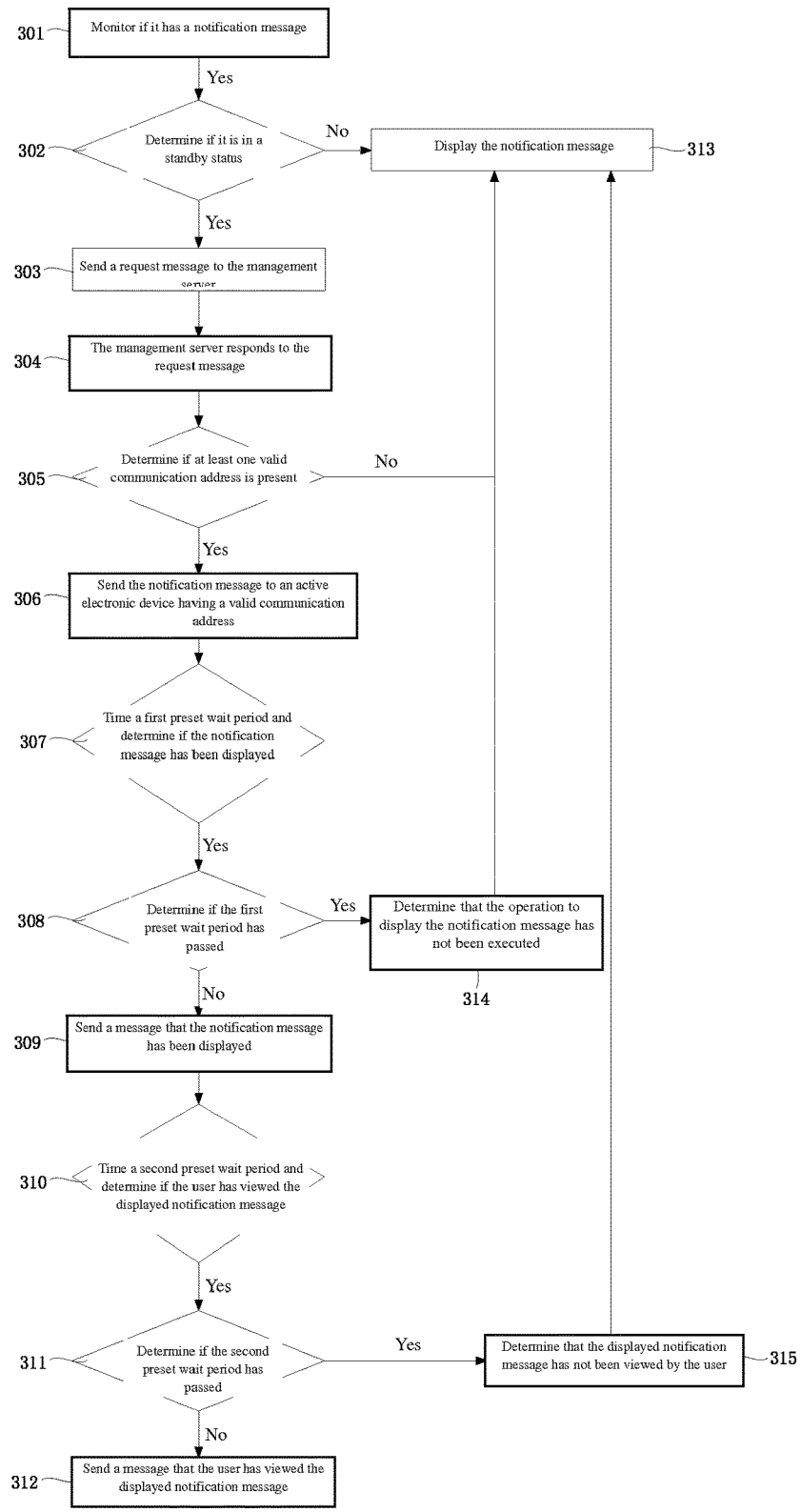
FIG. 5 depicts a flow chart of the method of synchronizing notification messages for electronic devices in an example according to at least one embodiment.

FIG. 4 illustrates communications between the management server and the electronic device according to at least one embodiment. FIG. 5 depicts a flow chart of a method of synchronizing notification messages for electronic devices according to at least one embodiment.

Referring to FIG. 1 through FIG. 5, the synchronization of notification messages for electronic devices can be carried out amongst the management server 10, the electronic device 20, the electronic device 30a and the electronic device 30b, where the electronic device 30a and the electronic device 30b can have the same configuration as that of the above electronic device 30.

However, it should be understood that the synchronization of notification messages for electronic devices according to at least one embodiment can be carried out amongst the management server 10, at least one electronic device 20 and at least one electronic device 30, or may be carried out among the management server 10 and at least two electronic devices 20. In at least one embodiment the server management 10 may also be placed inside an electronic device. For example, the management server 10 may be placed inside the electronic device 20, the electronic device 30a or the electronic device 30b.

In at least one embodiment, the electronic device 20, the electronic device 30a and the electronic device 30b can use the unique identifier (e.g. a device identifier) of their own, respectively, to register with the identification and association module 101 (as illustrated in FIG. 1) so as to obtain the simplified unique identifier assigned by the identification and association module 101. In such a way, the identification and association module 101 can associate the electronic device 20, the electronic device 30*a* and the electronic device 30*b* that use the same unique identifier and can form an electronic device set. In addition, the simplified unique identifier can be used as the ID identifier of each electronic device during communications. The simplified unique identifier herein may be an identifier of the same type as the unique identifier used by each electronic device during registration with the identification and association module 101, or may be an identifier of any other form and/or format that is assigned by the identification and association module 101 to each electronic device and can be identified and understood by the identification and association module 101, to which there is no specific limitation by any embodiment of the present invention.

In at least one embodiment, when the second display module 303 of the electronic device 30*a* or the electronic device 30*b* is in an active status (e.g., the second display module 303 may be a touchscreen, and its active status may be a status that the touchscreen is turned on or being touched, or a status that other components with human-machine interaction functions on the electronic device 30 are working), the third sending module 304 of the electronic device 30*a* or the electronic device 30*b* can send the active notification message to the identification and association module 101, the identification and association module 101 can add the communication address of the electronic device 30*a* or the electronic device 30*b* into the communication address list of active electronic devices managed thereby according to the message identifier (e.g. the message identifier may be the unique identifier used by the electronic device 30*a* or the electronic device 30*b* during registration with the identification and association module 101, or may be the simplified unique identifier assigned by the identification and association module 101 to the electronic device 30*a* or the electronic device 30*b*) carried in the active notification message. When the second display module 303 of the electronic device 30*a* or the electronic device 30*b* is in a standby status (e.g., a status such as the screen is turned off), the third sending module 304 of the electronic device 30*a* or the electronic device 30*b* can send the standby notification message to the identification and association module 101, the identification and association module 101 can delete the communication address of the electronic device 30*a* or the electronic device 30*b* from the communication address list of active electronic devices managed thereby according to the message identifier (e.g. the message identifier may be the unique identifier used by the electronic device 30*a* or the electronic device 30*b* during registration with the first control module 101, or may be the simplified unique identifier assigned by the identification and association module 101 to the electronic device 30*a* or the electronic device 30*b*) carried in the standby notification message.

FIG. 5 depicts a flow chart of the method of synchronizing notification messages for electronic devices according to at least one embodiment. In step 301, the monitoring module 201 monitors if the electronic device 20 has a notification message. If the monitoring module 201 monitors that the electronic device 20 has a notification message, then the process proceeds to step 302. In step 302, the determining module 202 determines if the first display module 204 is in a standby status. Non-limiting examples of the notification message may be, for example, a call reminder, an IM (instant message), a text message, a message prompt from an auxiliary device, a call prompt from other devices, a message of electronic device status alarm or a message of electronic device application prompt, If the determining module 202 of the electronic device 20 determines that the first display module 204 is in an active status, the process proceeds to step 313. In step 313, the first display module 204 of the electronic device 20 can display the notification message.

If the determining module 202 determines that the first display module 204 is in a standby status, the process proceeds to step 303. In step 303, the second sending module 203 can send a request message to the first receiving module 102 of the management server 10, where the request message can be used to request a communication address list of active electronic devices managed by the identification and association module 101 (e.g. the active electronic device 30*a* and electronic device 30*b* of the second display module 303), and the request message can carry a message identifier (for example, the message identifier can be the unique identifier used by the electronic device 20 during registration with the identification and association module 101, or may be the simplified unique identifier assigned by the identification and association module 101 to the electronic device 20).

Subsequently in step 304, the first sending module 102 of the management server 10 can respond to the request message, and can return the communication address list includes the communication addresses of the active electronic device 30*a* and electronic device 30*b* of the second display module 303 in the electronic device set 2030 to the second receiving module 205 of the electronic device 20 according to the message identifier carried by the request message.

Subsequently in step 305, the first control module 206 of the electronic device 20 can determine if at least one valid communication address is present in the communication address list. If the first control module 206 of the electronic device 20 can determine that at least one valid communication address of a device other than the device itself is present, the process proceeds to step 306. In at least one embodiment, the first control module 206 of the electronic device 20 can determine that all communication addresses of the electronic device 30*a* are valid.

In step 306, the second sending module 203 of the electronic device 20 can send the notification message to the second receiving module 201 of the electronic device 30*a*. In step 306, for example, the second sending module 203 can send the notification message to the active electronic device 30*a* associated with the electronic device 20 and having a valid communication address. In step 305, moreover, if the first control module 206 of the electronic device 20 determines that no valid communication address is present in the communication address list, then none of communication addresses of the electronic device 30*a* and the electronic device 30*b* are valid; the process proceeds to step 313.

Subsequently in step 307, the first control module 206 of the electronic device 20 can keep time of a first preset wait period and determines if the second display module 303 of the electronic device 30*a* has displayed the notification message. If the first control module 206 of the electronic device 20 determines that the second display module 303 of the electronic device 30*a* has displayed the notification message, then the process proceeds to step 308.

In step 308, the first control module 206 of the electronic device 20 determines if the first preset wait period has passed. If the first control module 206 of the electronic device 20 determines that the first preset wait period has not passed, the process proceeds to step 309.

In step 309, the third sending module 304 of the electronic device 30a can send the message that the second display module 303 has displayed the notification message to the second receiving module 205 of the electronic device 20. For example, if the first control module 206 determines that the first preset wait period has not passed, the first control module 206 determines that the electronic device 30a has executed the operation to display the notification message.

If the first control module 206 of the electronic device 20 determines that the first preset wait period has passed, the process proceeds to step 314. In step 314, the third sending module 304 of the electronic device 30a can send the message that the second display module 303 has not displayed the notification message to the second receiving module 205 of the electronic device 20. For example, if the first control module 206 of the electronic device 20 determines that the first preset wait period has passed, the first control module 206 of the electronic device 20 can determine that the second display module 303 of the electronic device 30a has not executed the operation to display the notification message, and then the process proceeds to step 313.

Subsequently in step 310, the first control module 206 of the electronic device 20 can keep time of a second preset wait period and can determine if the user has viewed the notification message displayed by the second display module 303 of the electronic device 30a. If the first control module 206 of the electronic device 20 determines that the user has viewed the notification message displayed by the second display module 303 of the electronic device 30a, then the process proceeds to step 311.

In step 311, the first control module 206 of the electronic device 20 determines if the second preset wait period has passed. If the first control module 206 of the electronic device 20 determines that the second preset wait period has not passed, then the process proceeds to step 312.

In step 312, the third sending module 304 of the electronic device 30a can send the message that the user has viewed the notification message to the second receiving module 205 of the electronic device 20.

In step 311, moreover, if the first control module 206 of the electronic device 20 can determine that the second preset wait period has passed, then the process proceeds to step 315. In step 315, the first control module 206 of the electronic device 20 can determine that the user has not viewed the notification message displayed by the second display module 303 of the electronic device 30a. For example, if the first control module 206 of the electronic device 20 determines that the second preset wait period has passed, the first control module 206 determines that the user has not viewed the notification message displayed by the second display module 303 of the electronic device 30a regardless whether the second receiving module 205 of the electronic device 20 receives or does not receive a message that the notification message displayed by the second display module 303 of the electronic device 30a has been viewed by the user, and then the process proceeds to step 313.

Moreover, when the user views the notification message displayed on the second display module 303 of the electronic device 30a at a future time (e.g. a time after the second preset wait period), the third sending module 304 of the electronic device 30a may send the message that the user has viewed the notification message to the second receiving module 205 of the electronic device 20.

The embodiments of the methods discussed herein are only examples. At least some operations of the methods may be carried out contemporaneously, in a different order or completed omitted.

The above content of discussions of embodiments of the present invention may be implemented by hardware or firmware, or may be implemented through running software or computer codes stored in a memory medium (such as a CD-ROM, DVD, magnetic tape, RAM, floppy disk, hard disk or magnetic optic disk) or computer codes that are originally stored in a remote memory medium or non-transient machine readable medium and downloaded through a network so as to be stored in a local memory medium, which enables the implementation of the method described herein by a general purpose computer or a dedicated processor or software stored in a memory medium using a programmable or dedicated hardware (such as ASIC or FPGA). As it is understood in the art, the computer, processor, microprocessor controller or programmable hardware comprises a memory part that can store or receive software or computer codes, for example, RAM, ROM and flash memory, where when the computer, processor or hardware accesses and runs the software or computer codes, the software or computer codes will implement the method described herein. In addition, it should be noted that when a general purpose computer accesses the codes for implementing the processes shown herein, the operations of the codes can convert the general purpose computer to a dedicated computer for executing the processes shown herein. Any function or step provided in the accompanying drawings may be implemented by hardware, software or a combination of the two, and may be executed, in full or in part, within programmable commands of the computer.

Although embodiments of the present invention has been demonstrated and described with reference to specific examples, those skilled in the art should understand that various changes in form and details may be made without departing from the spirit and scope of the present invention defined by the claims and equivalents thereof.

The invention claimed is:

1. A method of synchronizing notification messages for electronic devices, comprising:
   sending, via an electronic device, an identifier to a server, the identifier being the same as an identifier sent from at least one other electronic device to create a set of electronic devices associated with the electronic device;
   assigning, via the server, a second identifier to the electronic device, wherein the second identifier is a dynamic ID;
   receiving, via the electronic device and from the server, the second identifier assigned to the electronic device;
   determining, via the electronic device, that the electronic device has entered a standby status;
   sending, via the standby electronic device, a standby notification message to the server, the standby notification message causing the server to delete the standby electronic device from a list of addresses of active electronic devices in the set of electronic devices;
   determining, via the standby electronic device, that the standby electronic device has a notification message;
   sending, via the standby electronic device, a request message to the server, the request message including the second identifier;
   receiving, via the standby electronic device, and from the server, the list of addresses of active electronic devices in response to the request message;

identifying, via the standby electronic device, a second electronic device, in the set of electronic devices, based on whether the second electronic device is listed in the list of addresses of active electronic devices; and sending, via the standby electronic device, the notification message to the identified active second electronic device to be displayed on the identified active second electronic device;

determining, via the standby electronic device, if the identified active second electronic device has displayed the notification message within a first preset wait period;

receiving, via the standby electronic device, a message from the active second electronic device indicating that the active second electronic device has displayed the notification message, if the identified active second electronic device has displayed the notification message within the first preset wait period;

determining, via the standby electronic device, if the displayed notification message has been viewed by the user of the identified active second electronic device within the second preset time period;

receiving, via the standby electronic device, a message from the identified active second electronic device indicating that the user has not viewed the notification message displayed by the identified active second electronic device based on an expiration of the second preset time period; and in response to receiving the message from the identified active second electronic device indicating that the user has not viewed the notification message displayed by the identified active second electronic device based on the expiration of the second preset time period, displaying the notification message on the standby electronic device.

2. The method according to claim 1, further comprising:
determining, via the standby electronic device, that the identified active second electronic device has not displayed the notification message within the first preset wait period; and
receiving, via the standby electronic device, a message from the identified active second electronic device indicating that the identified active second electronic device has not displayed the notification message.

3. The method according to claim 1, further comprising:
receiving, via the standby electronic device, a message from the identified active second electronic device indicating that the user has viewed the notification message displayed by the active electronic device, if the user of the identified active second electronic device has viewed the notification message within the second preset time period.

4. The method according to claim 3, further comprising:
determining, via the standby electronic device, that the user of the identified active second electronic device has not viewed the notification message within the second preset time period; and
receiving, via the standby electronic device, a message from the identified active second electronic device indicating that the user has not viewed the notification message displayed by the identified active second electronic device.

5. The method according to claim 1, wherein the identifying the second electronic device, in the set of electronic devices, based on whether the second electronic device is listed in the list of addresses of active electronic devices further comprises:

identifying, via the standby electronic device, the active second electronic device based on a valid communication address in the list of addresses of active electronic devices.

6. The method according to claim 5, further comprising:
displaying the notification message via the standby electronic device, if the standby by electronic device cannot identify an active electronic device in the list of addresses of active electronic devices.

7. An electronic device, comprising:
at least one processor; and
a memory storing at least one instruction that when executed by the at least one processor causes the at least one processor to:
send an identifier to a server, the identifier being the same as an identifier sent from at least one other electronic device to create a set of electronic devices associated with the electronic device;
assign, via the server, a second identifier to the electronic device, wherein the second identifier is a dynamic ID;
receive, from the server, the second identifier assigned to the electronic device;
determine that the electronic device has entered a standby status;
send a standby notification message to the server, the standby notification message causing the server to remove the standby electronic device from a list of addresses of active electronic devices in the set of electronic devices;
determine that the electronic device has a notification message;
send a request message to the server, the request message including the second identifier;
receive, from the server, the list of addresses of active electronic devices in response to the request message;
identify a second electronic device, in the set of electronic devices, based on whether the second electronic device is listed in the list of addresses of active electronic devices;
send the notification message to the identified active second electronic device to be displayed on the identified active second electronic device;
determine if the identified active second electronic device has displayed the notification message within a first preset wait period;
receive a message from the active electronic device indicating that the active electronic device has displayed the notification message, if the identified active second electronic device has displayed the notification message within the first preset wait period;
determine if the displayed notification message has been viewed by the user of the identified active second electronic device within the second preset time period;
receive a message from the identified active second electronic device indicating that the user has not viewed the notification message displayed by the identified active second electronic device based on an expiration of the second preset time period; and
in response to receiving the message from the identified active second electronic device indicating that the user has not viewed the notification message displayed by the identified active second electronic device based on the expiration of the second preset time period, displaying the notification message on the electronic device, wherein the electronic device is in the standby status.

8. The electronic device according to claim 7, wherein the memory further stores at least one instruction that when executed by the at least one processor causes the at least one processor to:
   determine that the identified active second electronic device has not displayed the notification message within the first preset wait period; and
   receive a message from the identified active second electronic device indicating that the identified active second electronic device has not displayed the notification message.

9. The electronic device according to claim 8, wherein the memory further stores at least one instruction that when executed by the at least one processor causes the at least one processor to:
   receive a message from the identified active second electronic device indicating that the user has viewed the notification message displayed by the active electronic device, if the user of the identified active second electronic device has viewed the notification message within the second preset time period.

10. The electronic device according to claim 7, wherein the memory further stores at least one instruction that when executed by the at least one processor causes the at least one processor to:
    display the notification message via the standby electronic device, if the standby by electronic device cannot identify an active electronic device in the list of addresses of active electronic devices.

11. The electronic device according to claim 7, wherein the memory further stores at least one instruction that when executed by the at least one processor causes the at least one processor to:
    determine that the identified active second electronic device has not displayed the notification message within a first preset wait period; and
    receive a message from the identified active second electronic device indicating that the identified active second electronic device has not displayed the notification message.

12. The electronic device according to claim 9, wherein the memory further stores at least one instruction that when executed by the at least one processor causes the at least one processor to:
    determine that the user of the identified active second electronic device has not viewed the notification message within the second preset time period; and
    receive a message from the identified active second electronic device indicating that the user has not viewed the notification message displayed by the identified active second electronic device.

13. An electronic device, comprising:
   at least one processor; and
   a memory storing at least one instruction that when executed by the at least one processor causes the at least one processor to:
     send an identifier to a server, the identifier being the same as an identifier sent from at least one other electronic device to create a set of electronic devices associated with the electronic device;
     assign, via the server, a second identifier to the electronic device, wherein the second identifier is different from the identifier and the second identifier is a dynamic ID;
     receive, from the server, the second identifier assigned to the electronic device;
     determine that the electronic device has entered a standby status;
     send a standby notification message to the server, the standby notification message causing the server to delete the standby electronic device from a list of addresses of active electronic devices in the set of electronic devices;
     determine that the electronic device has a notification message;
     send a request message to the server, the request message including the second identifier;
     receive, from the server, the list of addresses of active electronic devices in response to the request message;
     identify a second electronic device, in the set of electronic devices, based on whether the second electronic device is listed in the list of addresses of active electronic devices;
     send the notification message to the identified active second electronic device to be displayed on the identified active second electronic device;
     determine whether the notification message has both been displayed on the identified active second electronic device and viewed by a user of the identified active second electronic device, based on a first preset wait period and a second preset wait period, respectively; and
     receive a message from the identified active second electronic device indicating that the user has not viewed the notification message displayed by the identified active second electronic device based on an expiration of the second preset time period; and
     in response to receiving the message from the identified active second electronic device indicating that the user has not viewed the notification message displayed by the identified active second electronic device based on the expiration of the second preset time period, displaying the notification message on the electronic device, wherein the electronic device is in the standby status.

14. The electronic device according to claim 13, wherein the memory further stores at least one instruction that when executed by the at least one processor causes the at least one processor to:
    receive a message from the active electronic device indicating that the active electronic device has displayed the notification message, if the identified active second electronic device has displayed the notification message within the first preset wait period.

15. The electronic device according to claim 14, wherein the memory further stores at least one instruction that when executed by the at least one processor causes the at least one processor to:
    determine that the identified active second electronic device has not displayed the notification message within the first preset wait period; and
    receive a message from the identified active second electronic device indicating that the identified active second electronic device has not displayed the notification message.

* * * * *